J. E. HITTER.
PLOW ATTACHMENT.
APPLICATION FILED JUNE 9, 1915.
1,169,036.
Patented Jan. 18, 1916.
4 SHEETS—SHEET 1.
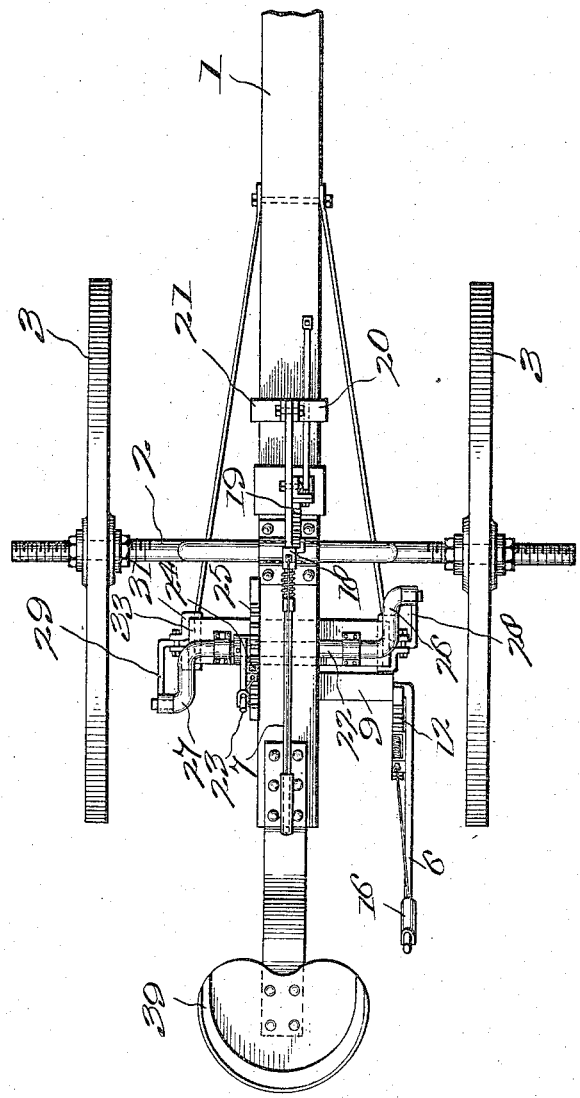

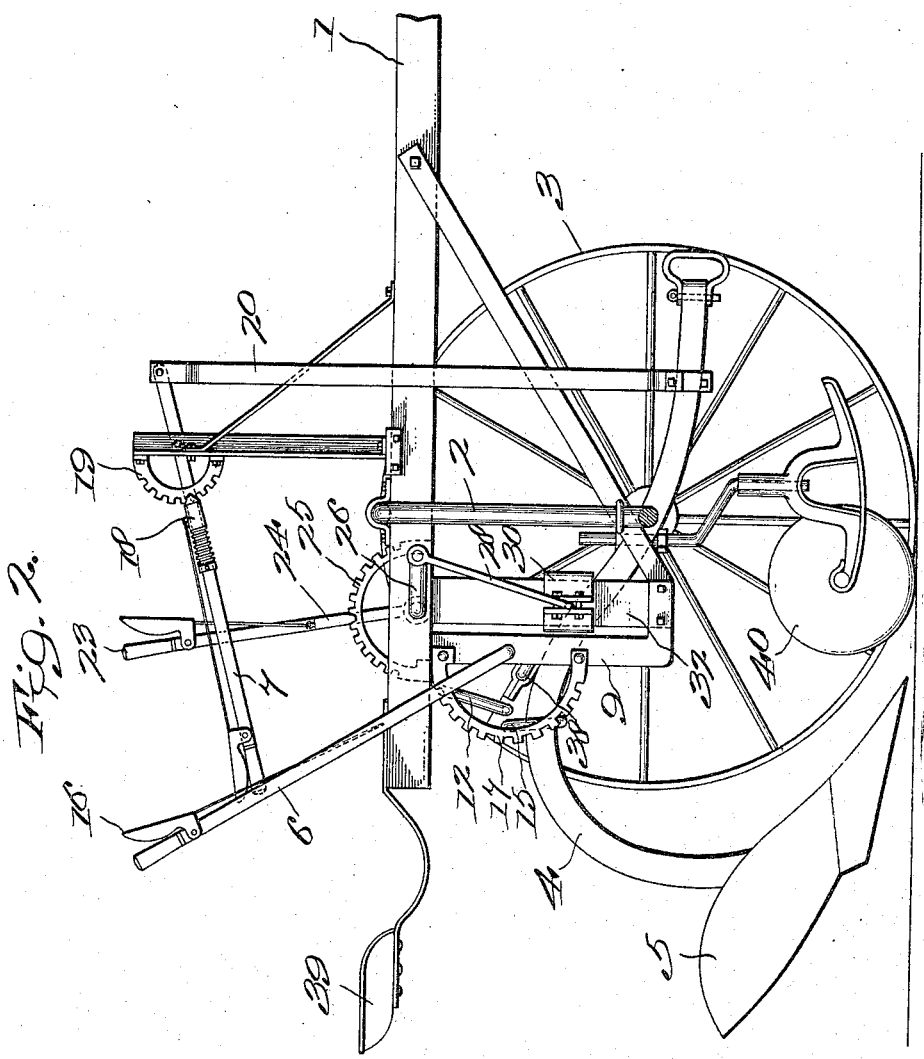

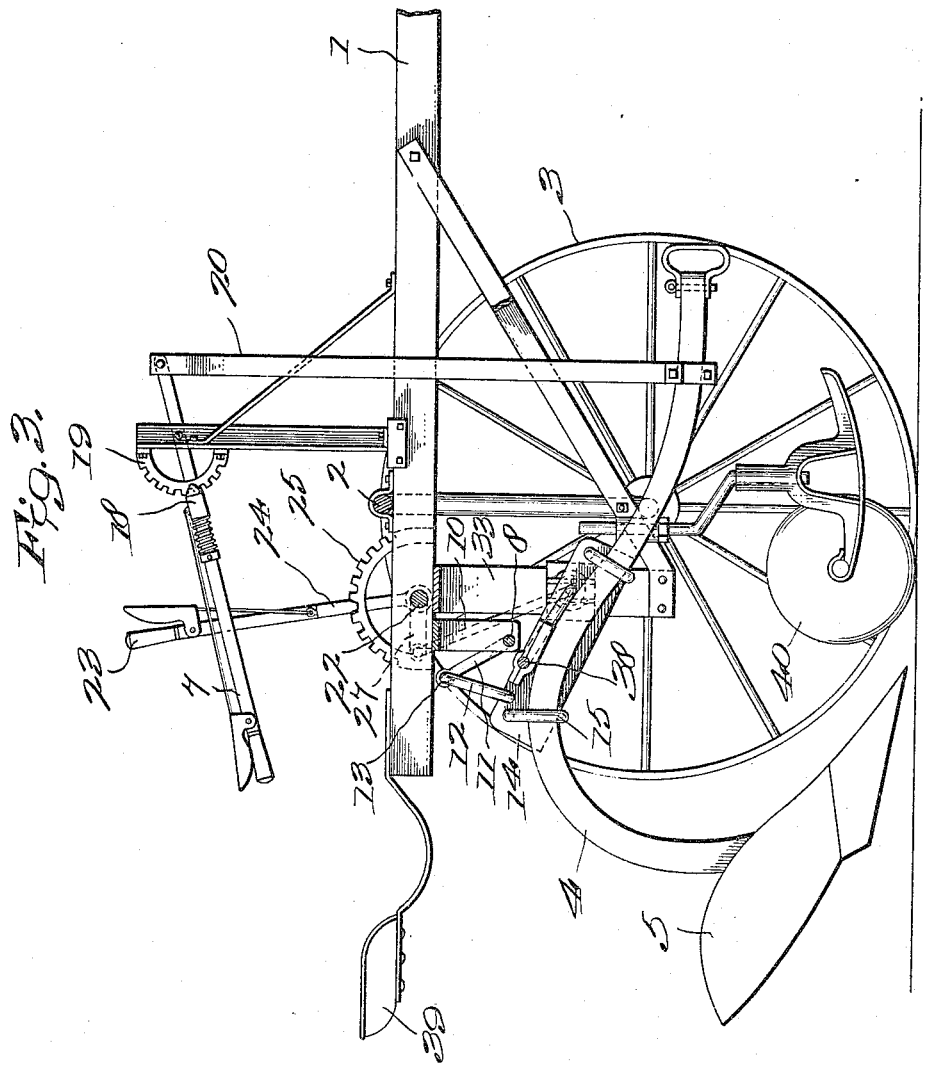

J. E. HITTER.
PLOW ATTACHMENT.
APPLICATION FILED JUNE 9, 1915.
1,169,036.
Patented Jan. 18, 1916.
4 SHEETS—SHEET 4.
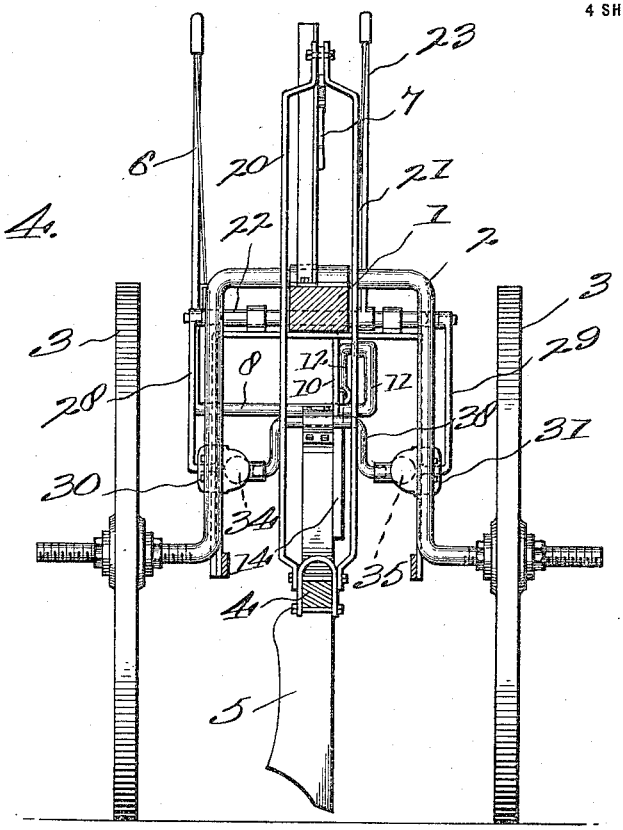
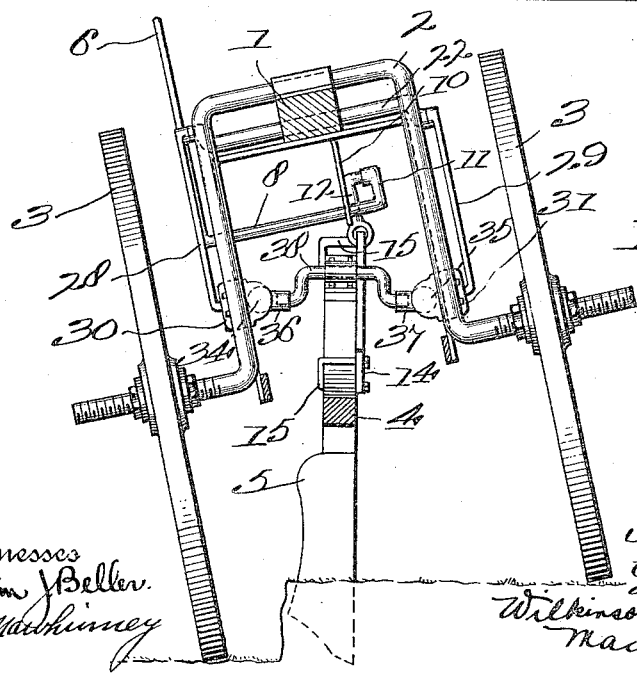
Witnesses
Edwin J Beller
R. J. McKinney
Inventor
J. E. Hitter,
by
Wilkinson, Giusta &
Mackaye,
Attorneys.

UNITED STATES PATENT OFFICE.

JOSEPH E. HITTER, OF NEW IBERIA, LOUISIANA.

PLOW ATTACHMENT.

1,169,036.  Specification of Letters Patent.  Patented Jan. 18, 1916.

Application filed June 9, 1915. Serial No. 33,169.

*To all whom it may concern:*

Be it known that I, JOSEPH E. HITTER, a citizen of the United States, residing at New Iberia, in the parish of Iberia and State of Louisiana, have invented certain new and useful Improvements in Plow Attachments; and I do hereby declare the following to be a full, clear, and exact description of the invention, such as will enable others skilled in the art to which it appertains to make and use the same.

The present invention relates to improvements in plow attachments, and has for an object to provide an improved wheel plow wherein the plow beam, carrying the share, will be connected to mechanism for raising and lowering the same into and out of operative position and for adjusting the depth to which the plow is to operate.

Another object of the present invention resides in providing an improved wheel plow in which the plowshare will be mounted for lateral adjustment to preserve the same in the vertical; and the invention contemplates improved mechanism whereby such lateral adjustment may be made and maintained.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views: Figure 1 is a top plan view of a wheel plow constructed in accordance with the present invention. Fig. 2 is a side elevational view of the same, with one wheel removed. Fig. 3 is a longitudinal sectional view of the improved plow. Fig. 4 is a transverse sectional view illustrating the improved plow in upright position; and Fig. 5 is a similar transverse sectional view illustrating the mechanism for shifting the plow laterally.

Referring more particularly to the drawings, 1 designates a draft beam connected to the usual arched axle 2, which latter is supported on ground wheels 3. The axle 2 is provided with elongated journals, as will appear in Figs. 4 and 5, and the ground wheels 3 are adjustable thereon to permit of shifting the same transversely whereby the device may straddle rows of varying widths.

The plow beam 4, carrying the plowshare 5, is suspended from the draft beam 1, and is connected to be raised and lowered into and out of operative position by a lever 6 and to be adjusted to any predetermined depth from a lever 7. The lever 6 is connected to actuate a shaft 8 journaled in hangers 9 and 10 depending from the draft beam 1.

To the opposite end of the shaft 8 is connected an arm 11, coupled to a link 12 by a loose joint 13. The link 12 engages a block or other device 14, connected by U-bolts or other means 15 to the plow beam 4.

It will be understood that the lever 6 may be moved to rock the shaft 8, and, through the interconnected arm 11 and link 12 raise or lower the plowshare 5 out of or into operative position, the adjustment being maintained by a latch 16 associated with the lever 6 and engaging a toothed segment 17 mounted on the hanger 9.

The depth regulating lever 7 is similarly provided with a latch 18, operating in conjunction with a toothed segment 19 to maintain the lever in adjusted position; and said lever 7 is connected to the forward end of the plow beam 4 by a link composed of oppositely disposed sections 20 and 21 straddling the draft beam 1, as will more particularly appear from an inspection of Fig. 4. After the plowshare 5 has been lowered into operative position by action of the lever 6, through the lever 7 and associated link, the forward end of the plow beam 4 may be rocked about the link 12 as a center to occupy any desired position for regulating the depth of furrow.

Journaled in the draft beam 1, in rear of the arched axle 2, is a rock shaft 22, connected to be actuated by a lever 23, under the control of a latch and segment 24 and 25, respectively; the same being bent at its ends into oppositely disposed cranks 26 and 27. The cranks 26 and 27 are connected by rods 28 and 29 to cross heads 30 and 31, mounted to slide on guides 32 and 33, respectively.

As advantageously disclosed in Figs. 4 and 5, the cross heads 30 and 31 are formed with sockets for the reception of universal balls 34 and 35 provided with bearings 36 and 37, wherein are journaled the trunnions of a crank shaft 38, connected to the block 14. By moving the lever 23 in the desired direction, cranks 26 and 27 are actuated to shift the cross heads 30 and 31 and adjust the plow beam and share to constantly occupy a vertical position, such as is essential to the best results, while the ground wheels 3, as shown in Fig. 5, are traveling one in the furrow and the other on the unplowed ground.

It will be understood that the action of the lever 23 and associated parts is so arranged as not to interfere with the various adjustments produced by the levers 6 and 7, said several levers being arranged convenient to the hand of an operator occupying a seat 39 secured in any suitable position upon the draft beam 1. Any suitable form of colter 40, may be connected to the plow beam 4, as desired; and any other suitable agricultural implements may be employed in conjunction with the invention as found necessary.

It is obvious that those skilled in the art may vary the details of construction and arrangements of parts without departing from the spirit of my invention, and therefore I do not wish to be limited to such features except as may be required by the claims.

I claim:—

1. The combination of a supporting structure, cross heads slidably mounted on said supporting structure, a shaft journaled in said cross heads, means for shifting said cross heads to tilt said shaft, and a plow connected to move with said shaft, substantially as described.

2. The combination of a supporting structure, cross heads slidably mounted on said supporting structure, bearings loosely mounted in said cross heads, a shaft journaled in the bearings on said cross heads, means for shifting said cross heads to tilt said shaft, and a plow connected to move with said shaft, substantially as described.

3. The combination of a supporting structure, cross heads slidably mounted on said supporting structure and provided with sockets therein, balls fitted in said sockets and forming universal joints therewith, bearings on said balls, a shaft journaled in said bearings, means for shifting said cross heads to tilt said shaft, and a plow connected to move with said shaft, substantially as described.

4. The combination of a supporting structure, cross heads mounted to slide on said supporting structure, a crank shaft journaled in said cross heads, a plow supported to move with said crank shaft, a rock shaft journaled in said supporting structure, means for actuating said rock shaft, and links connecting said rock shaft and cross heads for operating to tilt the crank shaft in either direction, substantially as described.

5. The combination of a supporting structure, cross heads mounted to slide on said supporting structure, a crank shaft journaled in said cross heads, a plow supported to move with said crank shaft, a rock shaft journaled in said supporting structure, oppositely disposed crank arms on said rock shaft, links connecting said cross heads with the oppositely disposed crank arms on said rock shaft, and means for actuating said rock shaft to shift the cross heads in opposite directions and tilt said crank shaft, substantially as described.

6. The combination of a supporting structure, cross heads mounted to slide on said supporting structure, bearings swivelly mounted in said cross heads, a shaft journaled in said bearings, a plow supported to move with said shaft, a rock shaft journaled in said supporting structure, means for actuating said rock shaft, and links connecting said rock shaft and cross heads for operating to tilt the crank shaft in either direction, substantially as described.

7. The combination of a supporting structure, cross heads mounted to slide in said supporting structure and provided with sockets therein, balls fitted in said sockets and constituting therewith universal joints, bearings on said balls, a shaft journaled in said bearings, a plow connected to move with said shaft, a rock shaft journaled in said supporting structure, means for actuating said rock shaft, and links connecting said rock shaft and cross heads for operating to tilt the plow shaft in either direction, substantially as described.

8. The combination of a wheeled supporting structure, guides on said supporting structure, cross heads mounted to slide on said guides and provided with sockets therein, balls journaled in said sockets and constituting therewith universal joints, bearings connected to said balls, a shaft journaled in said bearings and arranged to slide axially therein, a plow connected to move with said shaft, a rock shaft journaled in said supporting structure above said plow shaft, oppositely disposed crank arms on said rock shaft, links connecting said crank arms and cross heads, and means for oscillating said rock shaft to shift the cross heads in relatively opposite directions and tilt the plow shaft, substantially as described.

9. The combination of a wheeled supporting structure, a plow mounted on said supporting structure, means for moving said plow into and out of operative position, means for adjusting said plow to regulate the depth of furrow, and means for tilting said plow about a longitudinal axis comprising cross heads mounted to slide on said supporting structure, a crank shaft journaled in said cross heads and connected to actuate said plow, a rock shaft provided with oppositely disposed crank arms, connections between said crank arms and cross heads for moving the latter in opposite directions, and means for actuating said rock shaft, substantially as described.

10. The combination of a supporting structure including an arched axle having horizontally disposed and threaded ends, ground wheels threaded for adjustment on the ends of said arched axle, and a draft beam supported by said arched axle, a plowshare, a plow beam carrying said share, means for mounting said plow beam on said supporting structure, hangers depending from said supporting structure, a shaft journaled in said hangers, an arm on said shaft, a link connected to the rear end of said plow beam, a loose connection between said arm and link, means for actuating said shaft to raise and lower the plowshare into and out of operative position, a link composed of a pair of oppositely disposed sections straddling said draft beam and connected at its lower end to the forward end of said plow beam, and means for raising and lowering said link for adjusting the depth of said plowshare, substantially as described.

11. The combination of a supporting structure including an arched axle, a pair of ground wheels adjustably connected to said arched axle, and a draft beam supported by said arched axle, a pair of guides depending from said supporting structure, cross heads mounted to slide in said guides and provided with sockets therein, bearings mounted to swivel in the sockets in said cross heads, a crank shaft journaled in said bearings, a plow beam supported to tilt laterally with said crank shaft and to pivot thereabout, a rock shaft journaled in said supporting structure, oppositely disposed crank arms on said rock shaft, links arranged between said crank arms and cross heads, means for actuating said rock shaft to shift the cross heads in opposite directions and tilt the crank shaft, a pair of hangers depending from said supporting structure, a shaft journaled in said hangers, an arm on said shaft, a link connected to the rear end of said plow beam, a loose connection between said link and arm, means for moving said last-named shaft to shift the plow beam into and out of operative position, a link composed of a pair of oppositely disposed sections straddling said draft beam and connected at their lower ends to the forward ends of said plow beam, and means for raising and lowering said last-named link to regulate the depth of furrow, substantially as described.

In testimony whereof, I affix my signature.

JOSEPH E. HITTER.

Copies of this patent may be obtained for five cents each, by addressing the "Commissioner of Patents, Washington, D. C."